US006186938B1

(12) United States Patent
Harwell et al.

(10) Patent No.: US 6,186,938 B1
(45) Date of Patent: *Feb. 13, 2001

(54) SURFACTANT ENHANCED INTRINSIC REMEDIATION FOR RISK BASED SITE CLOSURE

(75) Inventors: Jeffrey H. Harwell; David A. Sabatini, both of Norman, OK (US)

(73) Assignee: The Board of Regents of the University of Oklahoma, Norman, OK (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/489,047

(22) Filed: Jan. 21, 2000

Related U.S. Application Data

(63) Continuation of application No. 09/303,809, filed on Apr. 30, 1999, now abandoned, which is a continuation of application No. 08/959,585, filed on Oct. 29, 1997, now abandoned.
(60) Provisional application No. 60/029,681, filed on Oct. 30, 1996.

(51) Int. Cl.$^7$ ................. B09C 1/00; B09C 1/02; C02F 1/28
(52) U.S. Cl. ............ 588/250; 210/747; 405/128; 405/264; 588/261
(58) Field of Search ............... 210/747; 405/52, 405/128, 263, 264; 588/249, 250, 261

(56) References Cited

U.S. PATENT DOCUMENTS

| | | | |
|---|---|---|---|
| 5,345,034 | * | 9/1994 | Corey ................................. 588/249 |
| 5,520,482 | * | 5/1996 | Oeste et al. ..................... 405/128 X |
| 5,520,483 | * | 5/1996 | Vigneri ............................. 405/128 |
| 5,593,248 | * | 1/1997 | Kansa et al. ..................... 405/128 |
| 5,725,470 | * | 3/1998 | Lazaraowitz et al. ........... 588/249 |
| 5,833,388 | * | 11/1998 | Edwards et al. ............. 210/747 X |
| 5,846,434 | * | 12/1998 | Seaman et al. .............. 210/747 X |
| 5,857,810 | * | 1/1999 | Cantrell et al. ................... 405/263 |

OTHER PUBLICATIONS

Soil Washing and Biotreatment of Petroleum–Contaminated Soils, Alok Bhandari, et al., pp. 1151–1169.
Enhanced Retention of Organic Contaminants by Soils Exchanged With Organic Cations, Jiunn–Fwu Lee, et al., 1989, pp. 1365–1372.
Effect of Ten Quaternary Ammonium Cations on Tetrachloromethane Sorption to Clay from Water, James A. Smith, et al., 1990, pp. 1167–1172.
Comparison of Tetrachloromehtane Sorption to an Alkylammonium–Clay and an Alkyldiammonium–Clay, James A. Smith, et al., 1991, pp. 2054–2058.
Aqueous Surfactant Washing of Residual Oil Contamination from Sandy Soil, Carolina C. Ang, 1991, pp. 121–127.

Precipitation of Mixtures of Anionic and Cationic Surfactants, Bor–Jier Shiau, et al., Oct. 22, 1991, pp. 332–345.
Surfactants and Subsurface Remediation, Candida C. West, et al., 1992, pp. 2324–2330.
Factors Affecting Surfactant Performance in Groundwater Remediation Applications, David A. Sabatini, et al., Jan. 24, 1992, pp. 124–132.
Partitioning of Three Nonionic Organic Compounds Between Adsorbed Surfactants, Micelles, and Water, Jae–Woo Park, et al., 1993, pp. 2559–2565.
Sorpotion of Nonionic Organic Compounds in Soil–Water Systems Containing Petroleum Sulfonate–Oil Surfactants, Shaobal Sun, et al., 1993, pp. 1340–1346.
Minimizing Surfactant Losses Using Twin–Head Anionic Surfactants in Subsurface Remediation, Joseph D. Rouse, et al., 1993, pp. 2072–2078.
Surfactant Adsolubilization and Modified Admicellar Sorption of Nonpolar, Polar, and Ionizable Organic Contaminants, Sandeep P. Nayyar, et al., 1994, pp. 1874–1881.
Solubilization and Microemulsification of Chlorinated Solvents Using Direct Food Additive (Edible) Surfactants, Bor–Jier Shiau, et al., 1994, pp. 561–569.
Sorption of Nonpolar Organic Compounds, Inorganice Cations, and Inorganic Oxyanions by Surfactant–Modified Zeolites, Robert S. Bowman, et al., 1995, pp. 54–64.
Influence of Anionic Surfactants on Bioremediation of Hydrocarbons, Joseph D. Rouse, et al., 1995, pp. 124–140.
Economic Considerations in Surfactant–Enhanced Pump–and–Treat Remediation, B. Krebs–Yuill, et al., 1995, pp. 265–278.
Solubilization in Surfactant Aggregates, Adsolubilization, John H. O'Haver, et al., 1995, pp. 277–295.

* cited by examiner

*Primary Examiner*—George Suchfield
(74) *Attorney, Agent, or Firm*—Dunlap, Codding & Rogers, P.C.

(57) ABSTRACT

Some ground water sites are capable of achieving risk-based closure without remedial efforts due to the soil's natural intrinsic remediation. However, in many cases this may not be possible due to the magnitude of the contamination. Surfactant enhanced intrinsic remediation is capable of enhancing natural remediation in several ways. First, by introducing the surfactant above its Krafft temperature when the ground water temperature is below the surfactant Krafft temperature, it is possible to install a permeable, sorptive wall that significantly decreases the contaminant migration, thereby improving the opportunity for natural intrinsic remediation to mitigate the contamination. If the contaminant levels are too great for this approach, as may be the case when "source zone" soil contamination is present, the approach is coupled with active extraction/ surfactant enhanced intrinsic remediation of the "source" zone (e.g., surfactant flushing). Thus, either by itself or in combination with other activities, an enhanced intrinsic remediation approach will allow for a site to undergo risk-based closure.

1 Claim, No Drawings

SURFACTANT ENHANCED INTRINSIC REMEDIATION FOR RISK BASED SITE CLOSURE

CROSS REFERENCE TO RELATED APPLICATIONS

This is a continuation of U.S. application Ser. No. 09/303,809, filed on Apr. 30, 1999. now abandoned, which is a continuation of U.S. application Ser. No. 08/959,585. filed on Oct. 29, 1997, now abandoned, which claims the benefit of U.S. Provisional application Ser. No. 60/029,681, filed Oct. 30, 1996, entitled

STATEMENT REGARDING FEDERALLY SPONSORED RESEARCH OR DEVELOPMENT

Not Applicable.

BACKGROUND

In the past ground water remediation has been driven by the question "how clean can we get it." However, many remediation efforts have produced limited success, even though significant resources were invested. This has resulted in several changes in the environmental remediation climate. First, the driving force for remediation is shifting from "how clean can we get it" to "what do we need to do to make the risk acceptable." This Risk Based Corrective Action (RBCA) approach has altered remediation goals by asking what level of cleanup, if any, is necessary to protect potential receptors. RBCA will promote the development of new methods for addressing less contaminated sites. Second, advanced technologies for environmental remediation are evolving. One such technology is surfactant-enhanced soil remediation, which targets remediation of "source zone soils"; i.e., contaminated soils that are continuing to leach contaminants into the ground water even after the original source is removed. Reasons for these source zone soils are the presence of oil phases trapped by capillary forces (residual saturation—e.g., gasolines, chlorinated solvents) or highly contaminated soils due to strongly sorbing contaminants (e.g., PCBs, PAHs). By greatly increasing the aqueous contaminant concentrations this approach can significantly reduce the time of remediation and volume of fluid extracted. Another evolving technology is the use of passive remediation techniques. Passive remediation involves a one time alteration of the system (e.g., installation of a reactive, permeable materials into a trench through which the contaminants will flow). A permeable, sorptive surfactant wall is one example of a passive remediation technique.

SUMMARY OF INVENTION

A surfactant is introduced into the subsurface of a soil environment at temperatures greater than the surfactant's Krafft temperature, with the ground water temperature of the soil environment being below the surfactant's Krafft temperature. This procedure results in a permeable, sorptive surfactant wall that will slow down the contaminant migration through the soil environment, thereby improving natural remediation. If necessary, this system may be combined with surfactant enhanced extraction of "source zone" contamination to allow risk-based closure of highly contaminated sites.

DETAILED DESCRIPTION OF INVENTION

By their very nature, surfactants accumulate (adsorb) at surfaces. When surfactants adsorb on soil surfaces, the adsorbed surfactant acts as a sink (adsorbent) for organic contaminants migrating through the soil (i.e., the migration rate of the organic contaminants is decreased). However, aqueous concentrations of the surfactant are required to maintain the surfactant adsorbed on the surface. By introducing an effective amount of a surfactant into the subsurface at temperatures greater than its Krafft temperature, while the ground water temperature is below the surfactant's Krafft temperature, increased contaminant sorption is realized without the expensive and time consuming step of maintaining an aqueous surfactant concentration on the surface of the soil environment. The Krafft temperature is the temperature below which the surfactant loses its solubility in solution. It has been found that by introducing the surfactant above its Krafft temperature (e.g., in heated solutions) such that adsorption to the surface occurs before the surfactant temperature falls below the surfactant's Krafft temperature, it is no longer necessary to maintain surfactant in solution to preserve the media-adsorbed surfactant and thereby eliminating a costly and time consuming step.

After a pre-determined time dependent upon environmental conditions, the subsurface almost always becomes self-cleansing on its own. While in the past virtually all contaminated sites have experienced extrinsic active remediation, the current remediation trend, disclosed herein, proposes to take advantage of the self-cleansing nature of subsurface systems (otherwise known as intrinsic remediation) aided by a surfactant sorption wall. In many cases the extent of contamination will overwhelm the self-cleansing nature of the subsurface and receptors will be exposed to the contamination. Thus, intrinsic remediation is generally not acceptable as a risk-based corrective action. In these cases, a permeable, sorptive surfactant wall (as described herein) is installed to intercept the contaminant and slow down its migration such that enhanced intrinsic remediation is effective, thus allowing risk-based closure of the site. This approach can also be coupled with surfactant enhanced extraction of source zone soils if this contamination will overwhelm the surfactant wall or result in unacceptable time frames of remediation.

One such surfactant that is contemplated for use with this process is sodium dodecyl sulfate. Sodium dodecyl sulfate has Krafft temperature of 16° C., and therefore is appropriate for use in subsurface systems having a seasonally high ground water temperature below 16° C. Another surfactant which may be used in the disclosed process is sodium octadecyl sulfate. Sodium octadecyl sulfate has a Krafft temperature of 56° C., and therefore is appropriate for use in a subsurface system with a seasonally high ground water temperature greater than 16° C. As is evident from the previous two examples, surfactants can be individually chosen for each discrete ground water application site based upon the seasonally high ground water temperature of the application site. Therefore, sodium dodecyl sulfate and sodium octadecyl sulfate are hereby given as examples of permissible surfactants and are not intended to limit the process in any manner. As will be understood by those with ordinary skill in the art, any surfactant having the appropriate Krafft temperature for the specific application site is contemplated for use in the novel remediation technique described hereinabove.

Changes may be made in the steps or the sequence of steps of the methods described herein without departing from the spirit and scope of the invention as defined in the following claims.

What is claimed:

1. A method of surfactant enhanced intrinsic remediation for risk based site closure without remedial steps comprising:

heating a surfactant to a temperature greater than the Krafft temperature of the surfactant;

injecting an effective amount of the heated surfactant into a subsoil surface enviroment wherein ground water of the subsoil surface enviroment has a seasonal temperature less than the Krafft temperature of the surfactant so as to form a permeable, sorptive wall whereby contaminant migration is substantially reduced and natural intrinsic migration mitigates the contamination.

* * * * *

UNITED STATES PATENT AND TRADEMARK OFFICE
CERTIFICATE OF CORRECTION

PATENT NO. : 6,186,938 B1
DATED : February 13, 2001
INVENTOR(S) : Harwell et al.

It is certified that error appears in the above-identified patent and that said Letters Patent is hereby corrected as shown below:

Column 1,
Line 13, after "entitled" please add -- SURFACTANT ENHANCED INTRINSIC REMEDIATION FOR RISK BASED SITE CLOSURE --.

Signed and Sealed this

Twentieth Day of July, 2004

JON W. DUDAS
*Acting Director of the United States Patent and Trademark Office*